(12) United States Patent
Foster

(10) Patent No.: US 11,241,120 B2
(45) Date of Patent: Feb. 8, 2022

(54) COOKING POT SUPPORT ASSEMBLY

(71) Applicant: John Foster, Irvine, CA (US)

(72) Inventor: John Foster, Irvine, CA (US)

( * ) Notice: Subject to any disclaimer, the term of this patent is extended or adjusted under 35 U.S.C. 154(b) by 202 days.

(21) Appl. No.: 16/728,645

(22) Filed: Dec. 27, 2019

(65) Prior Publication Data
US 2021/0196082 A1 Jul. 1, 2021

(51) Int. Cl.
*A47J 45/10* (2006.01)
*A47J 47/20* (2019.01)
*A47J 47/01* (2006.01)

(52) U.S. Cl.
CPC .............. *A47J 45/10* (2013.01); *A47J 47/01* (2013.01); *A47J 47/20* (2013.01)

(58) Field of Classification Search
CPC ...................................................... A47J 45/10
See application file for complete search history.

(56) References Cited

U.S. PATENT DOCUMENTS

| | | | |
|---|---|---|---|
| 1,456,803 A | 5/1923 | Judkins | |
| 1,973,269 A * | 9/1934 | Russell | A47J 45/10 294/34 |
| 2,934,210 A * | 4/1960 | Jordan | A47J 47/20 211/41.11 |
| 3,094,258 A * | 6/1963 | Punke | A47G 19/08 294/32 |
| 3,335,988 A * | 8/1967 | Herrick | A47J 37/0786 248/121 |
| D247,416 S | 3/1978 | Berman | |
| 4,169,638 A * | 10/1979 | Cirasuolo | A47L 19/04 211/41.6 |
| 4,214,400 A | 7/1980 | Buchsteiner | |
| 4,221,299 A | 9/1980 | Taylor | |
| 4,333,623 A * | 6/1982 | May | B05C 17/00523 248/117.2 |
| 4,577,092 A * | 3/1986 | Lenoir | A47J 37/0623 211/101 |
| 5,127,616 A * | 7/1992 | Carney | A47J 47/16 211/41.11 |
| 5,485,859 A | 1/1996 | Johnson | |
| 5,984,251 A * | 11/1999 | Davis | F16M 13/02 248/311.2 |
| 6,021,906 A * | 2/2000 | Heien | A47J 47/20 211/41.3 |
| 6,330,948 B1 * | 12/2001 | Leto | A47J 47/20 211/65 |

(Continued)

FOREIGN PATENT DOCUMENTS

| | | | |
|---|---|---|---|
| CA | 2775171 A1 * | 4/2013 | ............. A47L 19/02 |
| KR | 101502158 B1 * | 3/2015 | ............. A47J 47/20 |

*Primary Examiner* — Lori L Baker

(57) ABSTRACT

A cooking pot support assembly includes a support rack that has a grapple portion and a support portion. The grapple portion is positionable to engage a front edge of a sink having the support portion angling downwardly into the sink. The support portion has a cooking pot positioned thereon to support the cooking pot at an angle. In this way the support portion assists with pouring liquid from the cooking pot into the sink. A support is rotatably coupled to the support rack. The support is positionable in a deployed position to extend into the sink. The support includes a stop portion extending upwardly from the support rack to inhibit the cooking pot from sliding along the support rack into the sink.

8 Claims, 6 Drawing Sheets

(56) References Cited

U.S. PATENT DOCUMENTS

| | | | |
|---|---|---|---|
| 6,394,285 B1* | 5/2002 | Arthurs | A47L 15/505 |
| | | | 211/41.9 |
| D532,948 S * | 11/2006 | Gillisie | D32/55 |
| 7,735,661 B1 | 6/2010 | Sumner | |
| 8,479,926 B1* | 7/2013 | Blaisdell | A47J 47/16 |
| | | | 211/41.11 |
| 8,613,250 B1* | 12/2013 | Pruitt | A47J 47/16 |
| | | | 99/444 |
| 9,301,671 B2 | 4/2016 | Jarl | |
| 9,414,715 B2* | 8/2016 | Heron | A47J 47/16 |
| 9,526,378 B2* | 12/2016 | Heron | A47J 47/16 |
| 10,716,453 B1* | 7/2020 | Goldman | A47J 47/16 |
| 2010/0176017 A1* | 7/2010 | Yang | A47J 47/20 |
| | | | 206/373 |
| 2012/0318936 A1* | 12/2012 | Lutz | E04H 13/001 |
| | | | 248/121 |
| 2013/0068916 A1* | 3/2013 | Mensing | F16M 11/18 |
| | | | 248/558 |
| 2014/0332479 A1* | 11/2014 | Audet | A47L 19/04 |
| | | | 211/41.3 |
| 2019/0216242 A1* | 7/2019 | Vendel | A47J 45/10 |
| 2021/0186302 A1* | 6/2021 | Aparri | A47L 19/02 |

* cited by examiner

COOKING POT SUPPORT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cooking pot support devices and more particularly pertains to a new support device for supporting a cooking pot while pouring liquid from the cooking pot into a sink.

(2) Description of Related Art Including Information Disclosed Under 37 CFR 1.97 and 1.98

The prior art relates to cooking pot support devices. The prior art discloses a variety of dish rack that are foldable between deployed position and a stored position. Generally speaking, the dish racks disclosed in the prior art include a plurality of dish slots being integrated therein for storing plates for drying. The disk racks in the prior art disclosure are generally free standing. In at least one disclosure the disk rack straddles a kitchen sink for draining into the kitchen sink. The prior art discloses a dish rack that has a cassette being integrated therein for storing dishes during drying.

BRIEF SUMMARY OF THE INVENTION

An embodiment of the disclosure meets the needs presented above by generally comprising a support rack that has a grapple portion and a support portion. The grapple portion is positionable to engage a front edge of a sink having the support portion angling downwardly into the sink. The support portion has a cooking pot positioned thereon to support the cooking pot at an angle. In this way the support portion assists with pouring liquid from the cooking pot into the sink. A support is rotatably coupled to the support rack. The support is positionable in a deployed position to extend into the sink. The support includes a stop portion extending upwardly from the support rack to inhibit the cooking pot from sliding along the support rack into the sink.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
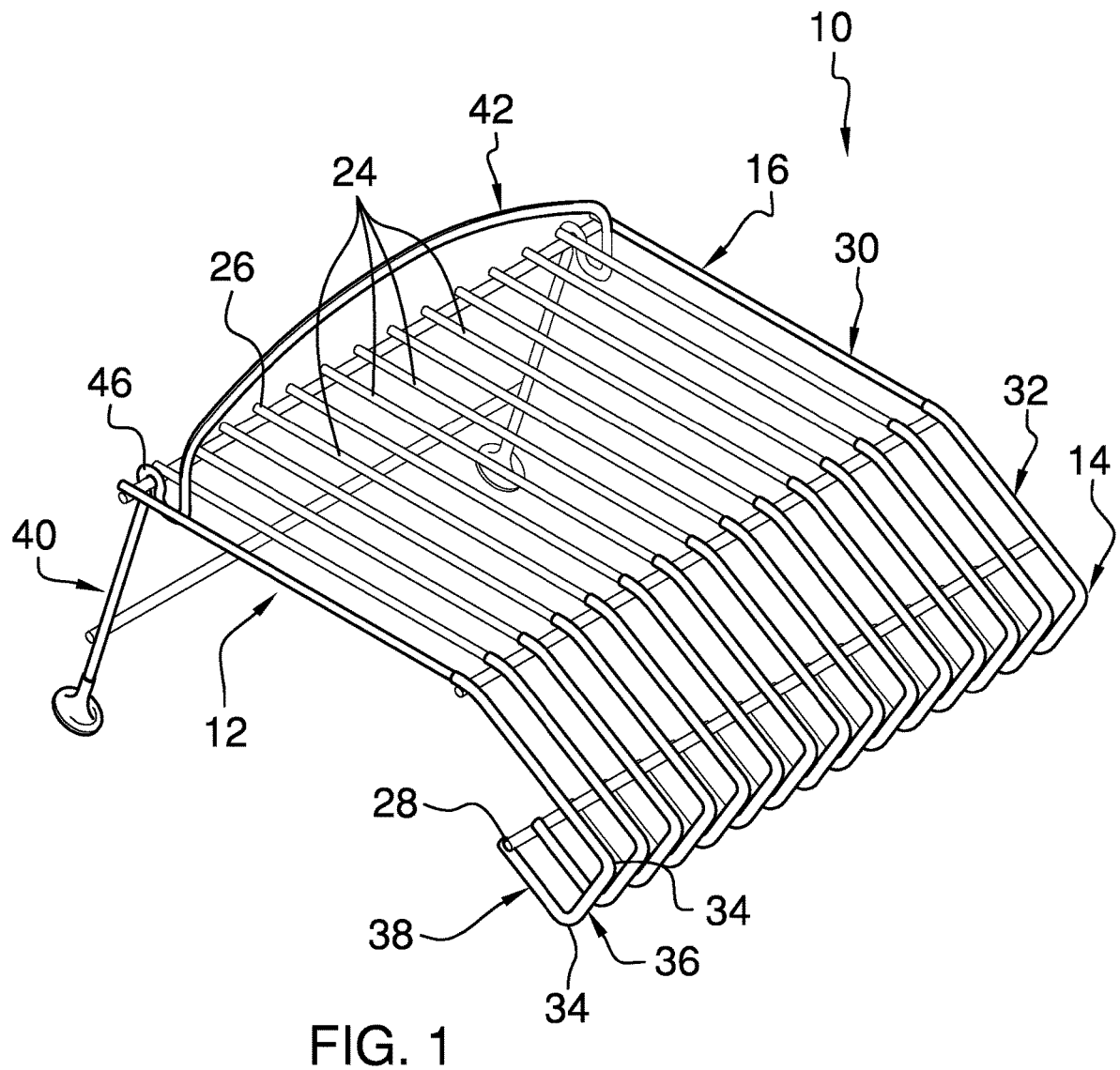
FIG. 1 is a top perspective view of a cooking pot support assembly according to an embodiment of the disclosure.
Figure 2:
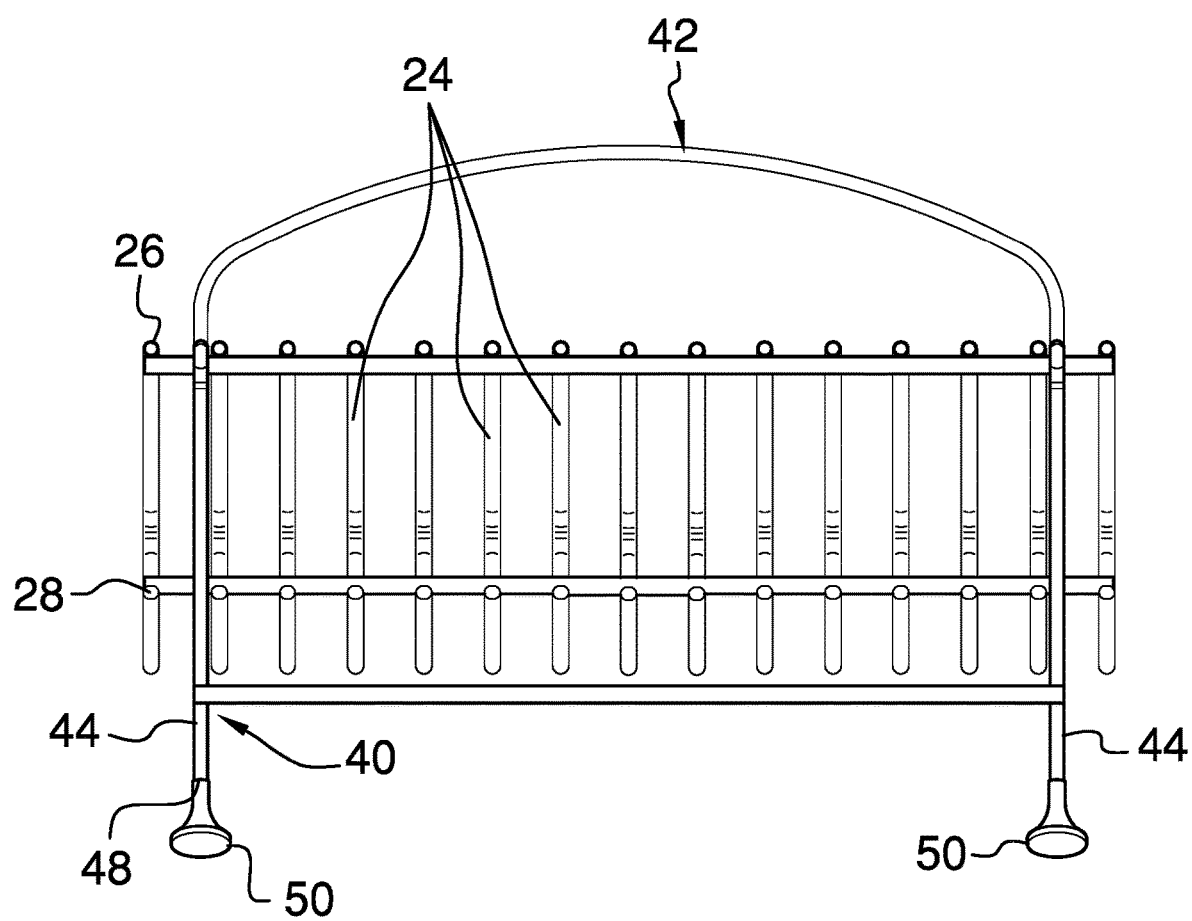
FIG. 2 is a front view of an embodiment of the disclosure.
Figure 3:
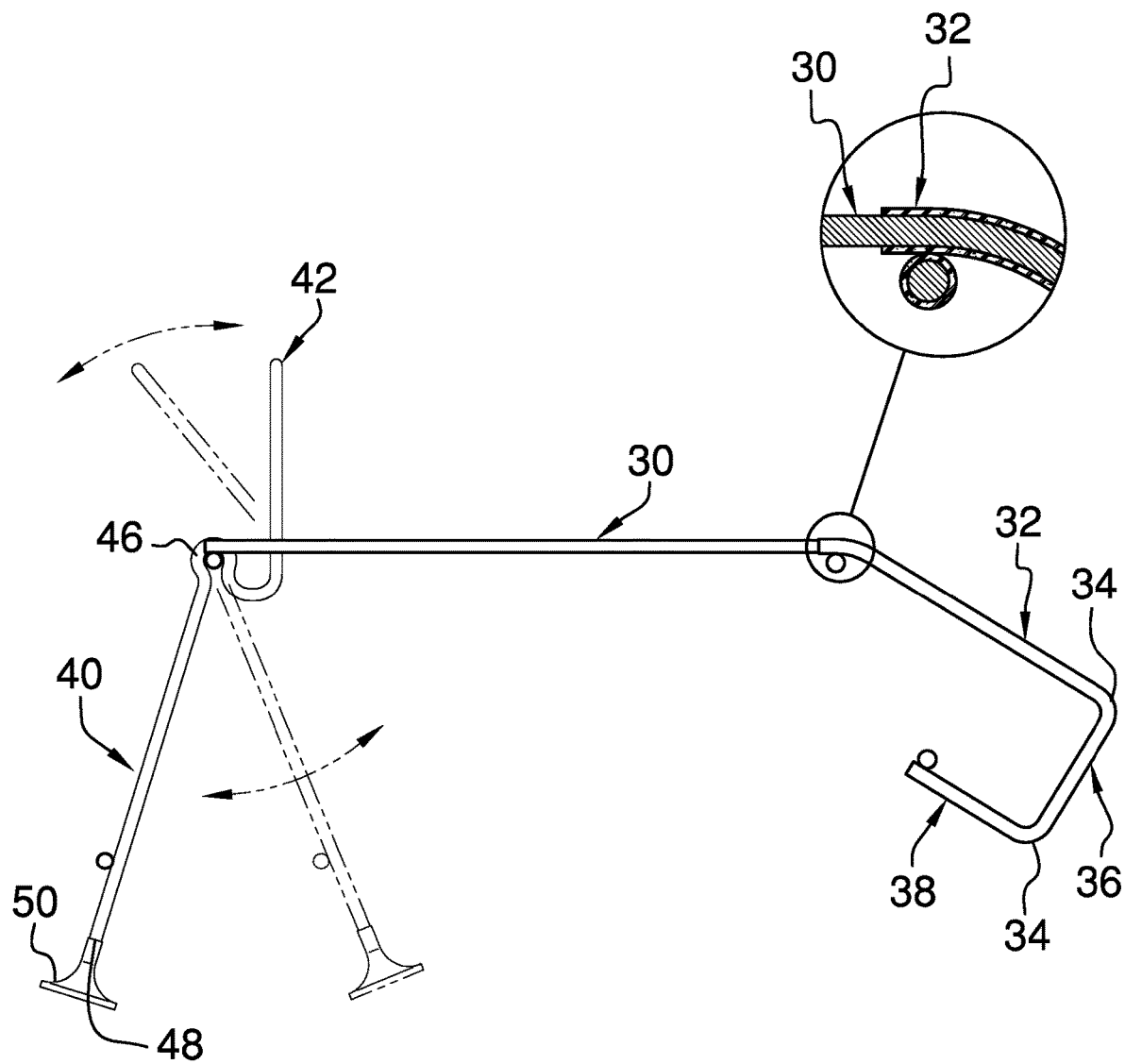
FIG. 3 is a left side view of an embodiment of the disclosure.
Figure 4:
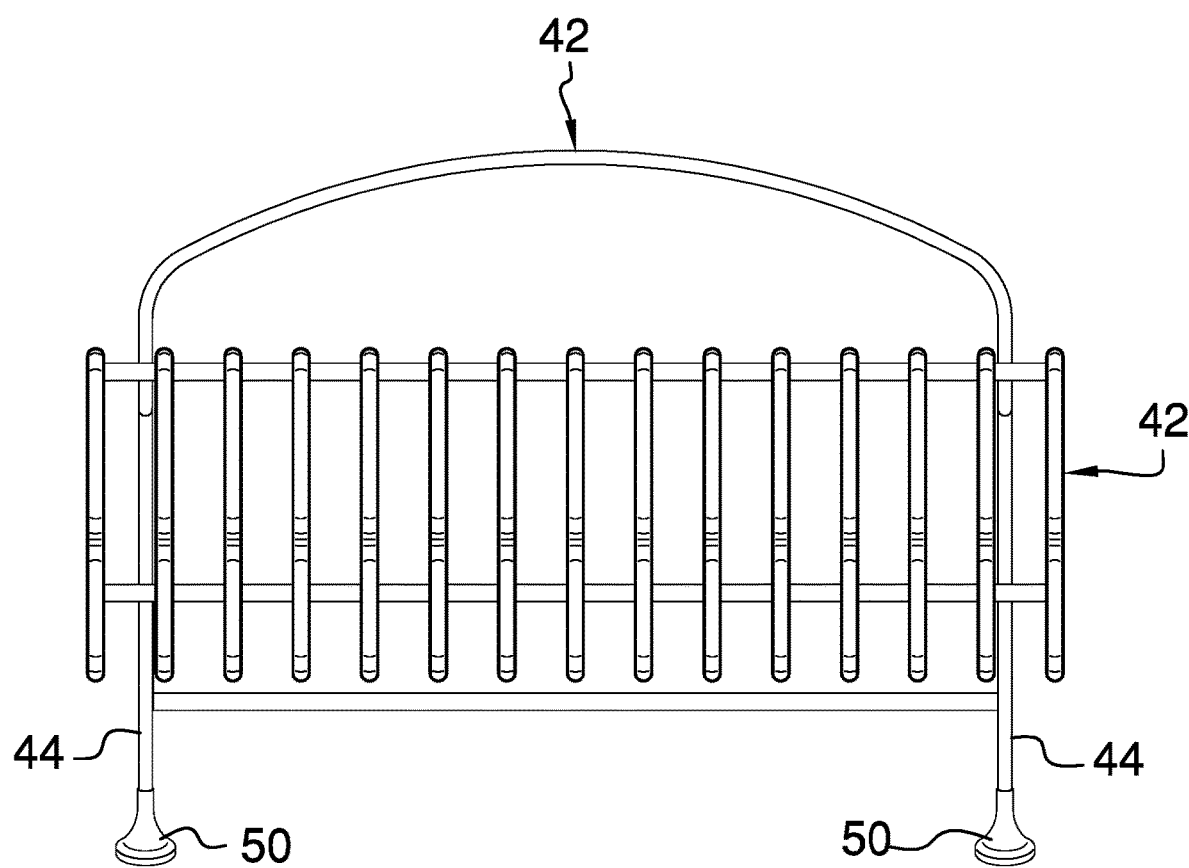
FIG. 4 is a back view of an embodiment of the disclosure.
Figure 5:
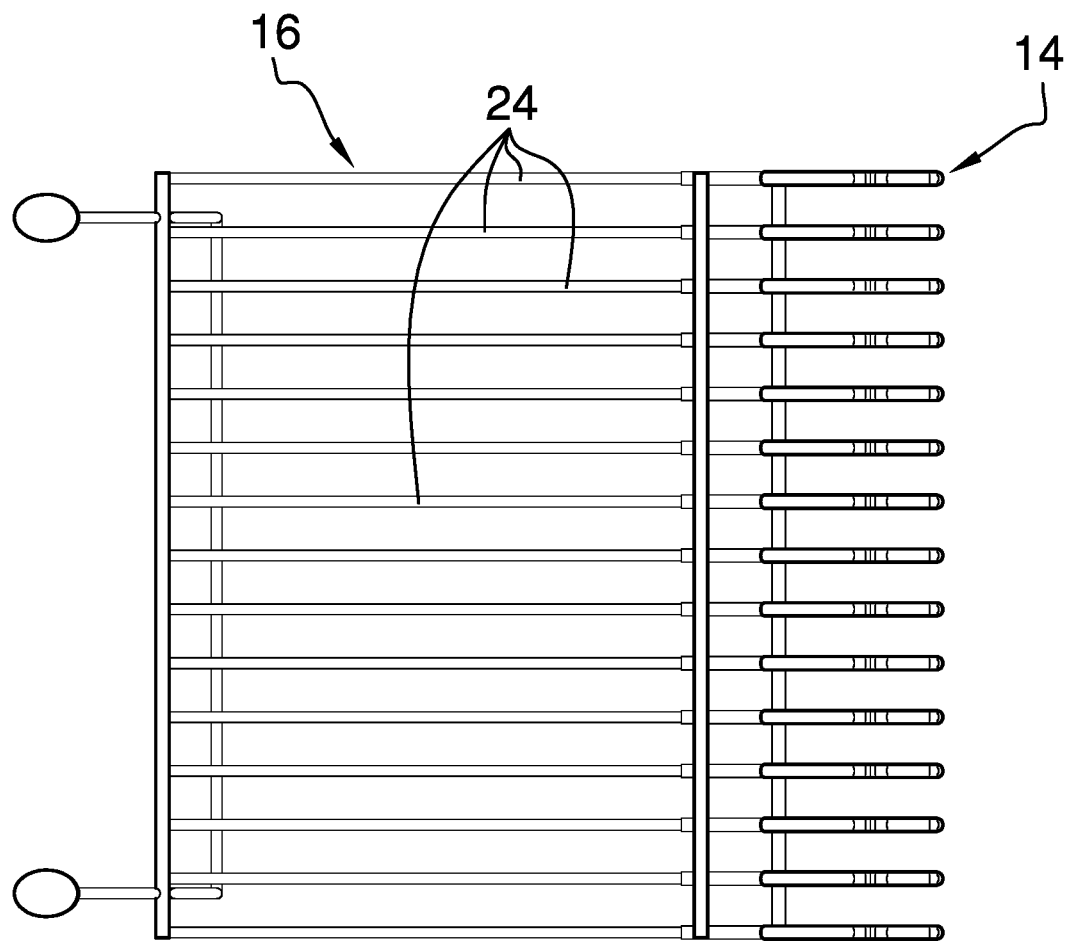
FIG. 5 is a bottom view of an embodiment of the disclosure.
Figure 6:
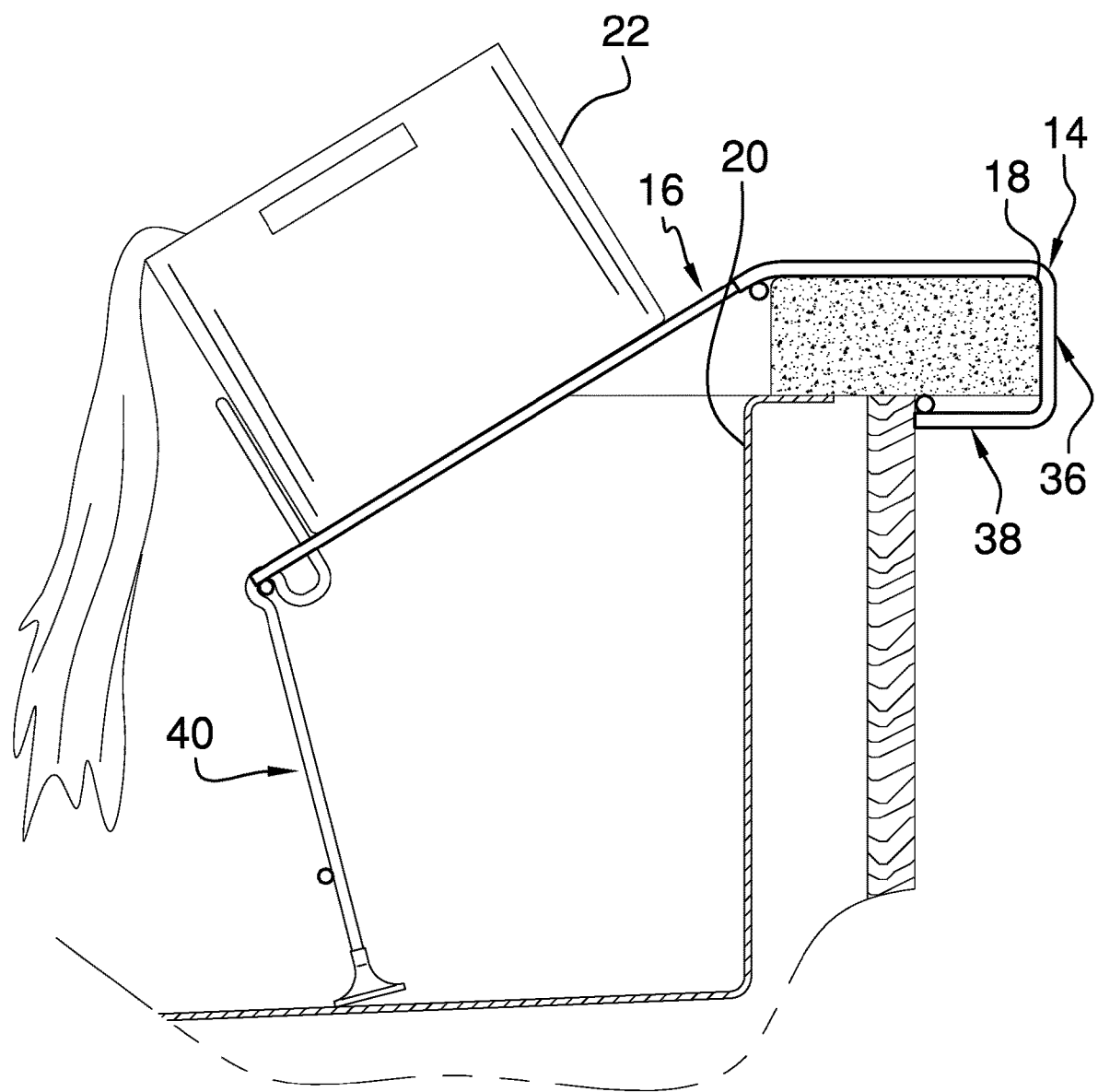
FIG. 6 is a perspective in-use view of an embodiment of the disclosure.

With reference now to the drawings, and in particular to FIGS. 1 through 6 thereof, a new support device embodying the principles and concepts of an embodiment of the disclosure and generally designated by the reference numeral 10 will be described.

As best illustrated in FIGS. 1 through 6, the cooking pot support assembly 10 generally comprises a support rack 12 that has a grapple portion 14 and a support portion 16. The grapple portion 14 is positionable to engage a front edge 18 of a sink 20 having the support portion 16 angling downwardly into the sink 20. The sink 20 may be a kitchen sink in a house or other similar type of plumbing fixture. Additionally, the front edge 18 of the sink 20 may be defined by a counter in which the sink 20 is positioned. A cooking pot 22 can be positioned on the support portion 16 such that the support portion 16 supports the cooking pot 22 at an angle to assist with pouring liquid from the cooking pot 22 into the sink 20. In this way a user can pour boiling water from the cooking pot 22 with minimal risk of spills or burns. Moreover, the cooking pot 22 may be a dutch oven or other similar sized cooking pot.

The support rack 12 includes a plurality of members 24 that are spaced apart from each other and are oriented collinear with each other. Each of the members 24 has a first end 26 and a second end 28, and each of the members 24 comprises a first section 30 that slidably engages a second section 32. The first end 26 is associated with the first section 30 and the second end 28 is associated with the second section 32. The first section 30 defines the support portion 16 of the support rack 12 and the second section 32 defines the grapple portion 14 of the support rack 12.

The grapple portion 14 is slidably adjustable on the support portion 16 to accommodate a variety of sink dimensions. The second section 32 of each of the members 24 has a sequence of bends 34 thereon to define a leg 36 and a foot 38 on the second section 32 of each of the members 24. Thus, the front edge 18 of the sink 20 is positionable to engage the leg 36 and the foot 38 of the second section 32 of each of the members 24.

A support 40 is rotatably coupled to the support rack 12. The support 40 is positionable in a deployed position to extend into the sink 20 and support the weight of the cooking pot 22. Moreover, the support 40 includes a stop portion 42 extending upwardly from the support rack 12 when the support 40 is positioned in the deployed position. The stop portion 42 abuts the cooking pot 22 thereby inhibiting the cooking pot 22 from sliding along the support rack 12 into the sink 20. In this way the stop portion 42 restrains the cooking pot 22 when the user is pouring liquid from the cooking pot 22 into the sink 20.

The support 40 includes a pair of legs 44 that has the stop portion 42 extending therebetween. Additionally, the legs 44 are oriented perpendicular to the stop portion 42. Each of the legs 44 has a loop 46 integrated therein and the loop 46 on each of the legs 44 rotatably engages the support rack 12 having the support 40 being disposed at the first end 26 of the members 24. Each of the legs 44 has a distal end 48 and a pair of feet 50 is each coupled to the distal end 48 of a respective one of the legs 44. Each of the feet 50 flares outwardly from the distal end 48 of the respective leg 44. Additionally, each of the feet 50 abuts the sink 20 when the support 40 is positioned in the deployed position.

In use, the grapple portion 14 is positioned to engage the front edge 18 of the sink 20 such that the support portion 16 angles downwardly into the sink 20. The support 40 is positioned in the deployed position and the cooking pot 22 is positioned on the support portion 16 of the support rack 12. In this way the cooking pot 22 is retained at a tilted angle to assist the user with pouring liquid out of the cooking pot 22. Thus, the user does not have to hold the cooking pot 22 while the liquid is being poured out of the cooking pot 22. In this way the risk of spilling the liquid is reduced, thereby protecting the user from potentially being burned from boiling water or other heated liquid that is poured from the cooking pot 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cooking pot support assembly being configured to support a cooking pot over a sink for safely pouring hot liquid from the cooking pot, said assembly comprising:
   a support rack having a grapple portion and a support portion, said grapple portion being positionable to engage a front edge of a sink having said support portion angling downwardly into the sink, said support portion having a cooking pot positioned thereon wherein said support portion is configured to support the cooking pot at an angle to assist with pouring liquid from the cooking pot into the sink; and
   a support being rotatably coupled to said support rack, said support being positionable in a deployed position to extend into the sink wherein said support is configured to support the weight of the cooking pot, said support including a stop portion extending upwardly from said support rack when said support is positioned in said deployed position having said stop portion abutting the cooking pot thereby inhibiting the cooking pot from sliding along said support rack into the sink wherein said stop portion is configured to restrain the cooking pot when the user is pouring liquid from the cooking pot into the sink.

2. The assembly according to claim 1, wherein said support rack includes a plurality of members being spaced apart from each other and being oriented collinear with each other, each of said members having a first end and a second end, each of said members comprising a first section that slidably engages a second section, said first end being associated with said first section, said second end being associated with said second section.

3. The assembly according to claim 2, wherein said first section defines said support portion of said support rack, said second section defining said grapple portion of said support rack, said grapple portion being slidably adjustable on said support portion wherein said support rack is configured to accommodate a variety of sink dimensions.

4. The assembly according to claim 3, wherein said second section of each of said members has a sequence of bends thereon to define a leg and a foot on said second section of each of said members such that the forward edge of said sink is positionable between said leg and said foot of said second section of each of said members.

5. The assembly according to claim 2, wherein said support includes a pair of legs having said stop portion extending therebetween and having said legs being oriented perpendicular to said stop portion.

6. The assembly according to claim 5, wherein each of said legs has a loop being integrated therein, said loop on each of said legs rotatably engaging said support rack having said support being disposed at said first end of said members, each of said legs having a distal end.

7. The assembly according to claim 6, further comprising a pair of feet, each of said feet being coupled to said distal end of a respective one of said legs, each of said feet flaring outwardly from said distal end of said respective leg, each of said feet abutting the sink when said support is positioned in said deployed position.

8. A cooking pot support assembly being configured to support a cooking pot over a sink for safely pouring hot liquid from the cooking pot, said assembly comprising:
   a support rack having a grapple portion and a support portion, said grapple portion being positionable to engage a front edge of a sink having said support portion angling downwardly into the sink, said support portion having a cooking pot positioned thereon wherein said support portion is configured to support the cooking pot at an angle to assist with pouring liquid from the cooking pot into the sink, said support rack including a plurality of members being spaced apart from each other and being oriented collinear with each other, each of said members having a first end and a second end, each of said members comprising a first section that slidably engages a second section, said first end being associated with said first section, said second end being associated with said second section, said first section defining said support portion of said support rack, said second section defining said grapple portion of said support rack, said grapple portion being slidably adjustable on said support portion wherein said support rack is configured to accommodate a variety of sink dimensions, said second section of each of said members having a sequence of bends thereon to define a leg and a foot on said second section of each of said members such that the forward edge of said sink is positionable between said leg and said foot of said second section of each of said members;

a support being rotatably coupled to said support rack, said support being positionable in a deployed position to extend into the sink wherein said support is configured to support the weight of the cooking pot, said support including a stop portion extending upwardly from said support rack when said support is positioned in said deployed position having said stop portion abutting the cooking pot thereby inhibiting the cooking pot from sliding along said support rack into the sink wherein said stop portion is configured to restrain the cooking pot when the user is pouring liquid from the cooking pot into the sink, said support including a pair of legs having said stop portion extending therebetween and having said legs being oriented perpendicular to said stop portion, each of said legs having a loop being integrated therein, said loop on each of said legs rotatably engaging said support rack having said support being disposed at said first end of said members, each of said legs having a distal end; and a pair of feet, each of said feet being coupled to said distal end of a respective one of said legs, each of said feet flaring outwardly from said distal end of said respective leg, each of said feet abutting the sink when said support is positioned in said deployed position.

\* \* \* \* \*